Figure 6:
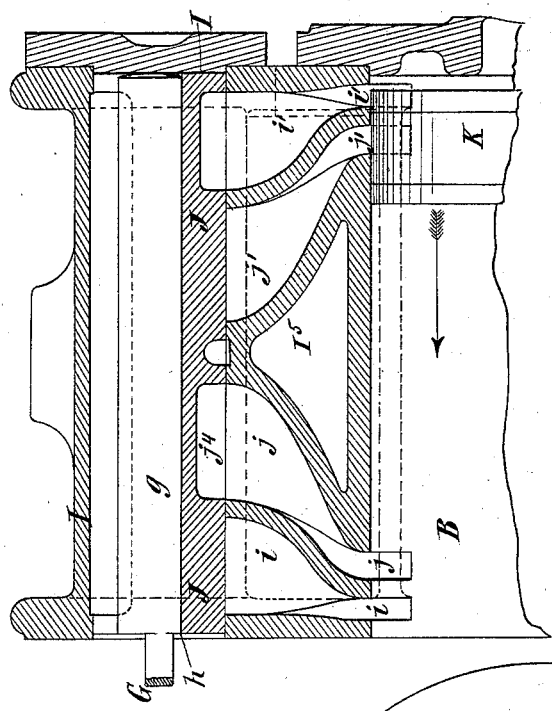

(No Model.)  3 Sheets—Sheet 1.
G. H. REYNOLDS & T. J. RIDER
DUPLEX PUMPING ENGINE.
No. 302,427.  Patented July 22, 1884.
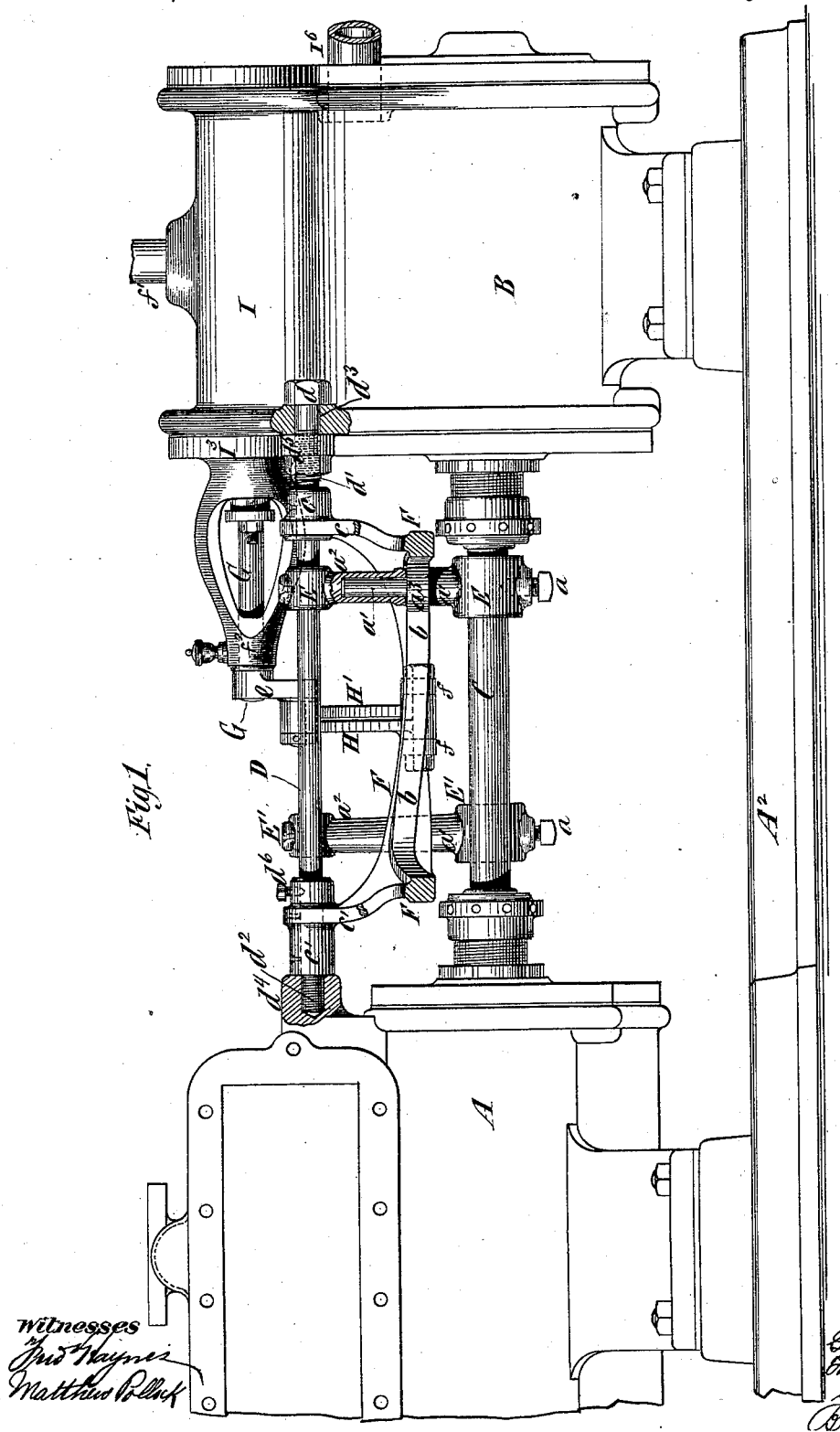
Witnesses
Inventors (No Model.) 3 Sheets—Sheet 2.
G. H. REYNOLDS & T. J. RIDER.
DUPLEX PUMPING ENGINE.
No. 302,427. Patented July 22, 1884.
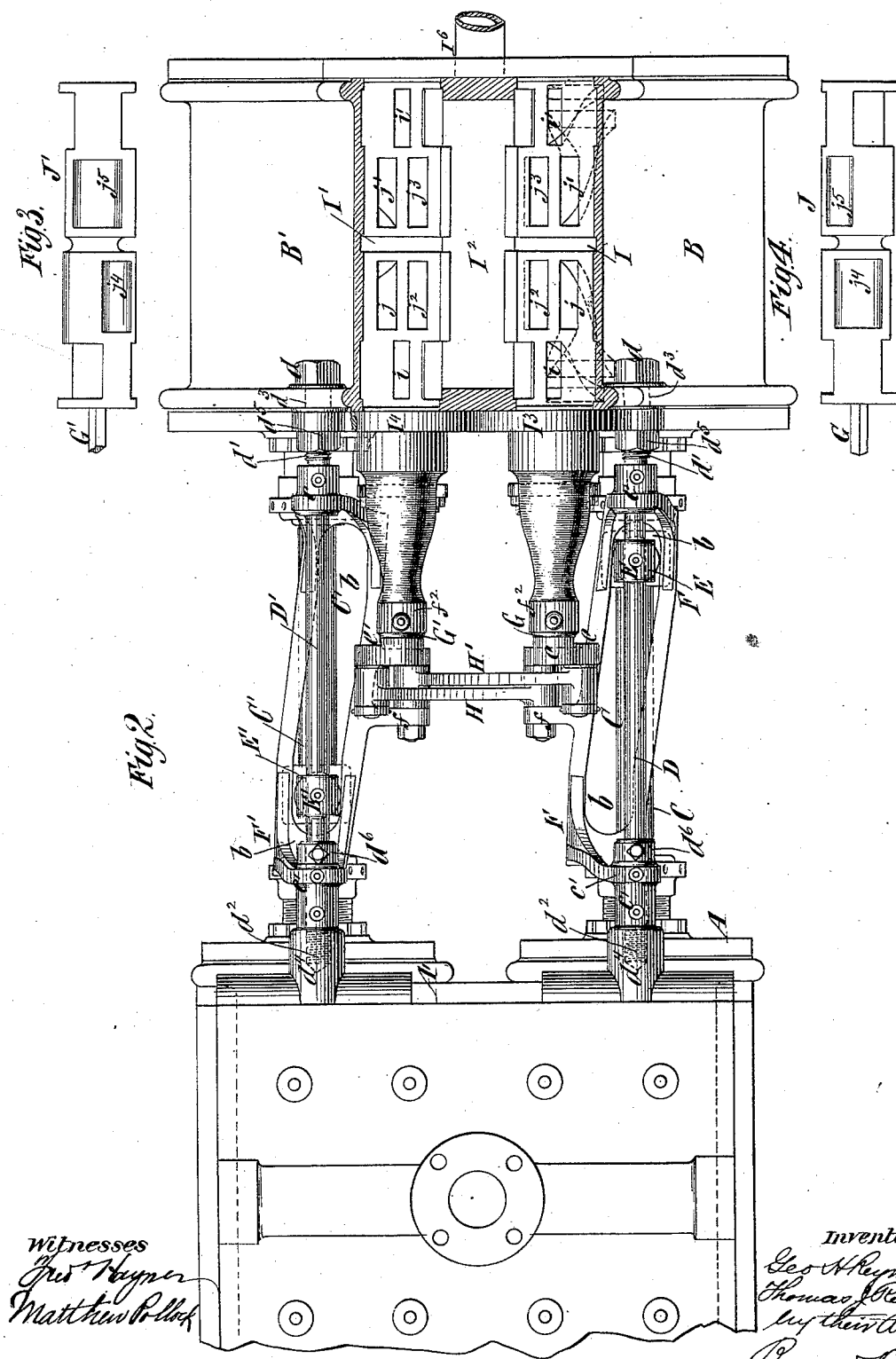

(No Model.) 3 Sheets—Sheet 3.

G. H. REYNOLDS & T. J. RIDER.
DUPLEX PUMPING ENGINE.

No. 302,427. Patented July 22, 1884.

Witnesses
Fred Haynes
Matthew Pollock

Inventors
Geo. H. Reynolds
Thomas J. Rider
by their Attys
Brown & Hall

UNITED STATES PATENT OFFICE.

GEORGE H. REYNOLDS AND THOMAS J. RIDER, OF NEW YORK, N. Y., ASSIGNORS OF ONE-HALF TO CORNELIUS H. DELAMATER, GEORGE H. ROBINSON, AND WILLIAM DELAMATER.

DUPLEX PUMPING-ENGINE.

SPECIFICATION forming part of Letters Patent No. 302,427, dated July 22, 1884.

Application filed February 19, 1884. (No model.)

*To all whom it may concern:*

Be it known that we, GEORGE H. REYNOLDS and THOMAS J. RIDER, both of the city and county of New York, in the State of New York, have invented a new and useful Improvement in Duplex Pumping-Engines, of which the following is a specification.

Our invention relates to duplex pumping-engines or steam-pumps in which the valve of each engine or pump is operated by means of connections from the piston-rod of the other engine or pump.

In duplex pumping-engines or steam-pumps as heretofore generally constructed the valves have been arranged to open and close by a movement lengthwise of the cylinders, or in the direction of movement of the pistons. Such valves have been operated by a system of rock-shafts and levers, which are arranged between the water and steam cylinders, or by means of long rods or connections, extending outside of or between the two steam cylinders to the rear ends thereof, and there connected to levers for operating the valves. According to our invention, we employ rocking or reciprocating rotary valves, one for each steam-cylinder, which are arranged with their axes parallel with the axes of the steam-cylinders, and which are preferably of approximately the same length as the steam-cylinders. The stems of these valves are extended forward considerably beyond the front ends of the two steam-cylinders, and the valves have no longitudinal movement, and are susceptible of a rocking or reciprocating rotary movement only. Each piston-rod is furnished with an upwardly-projecting arm, and during the whole length of piston-stroke this arm moves in a slotted valve-cam, which oscillates on a rod extending parallel with the piston-rod, and which has a slight swinging movement imparted to it in a direction transverse to the piston-rod by the movement of said arm in its slot. The said valve-cam of each engine is connected by a rod with an arm on the valve-stem of the other engine, and through said rod imparts a slight rocking movement to the valve. The parts above described for operating the valves are simple and inexpensive of construction, and by them the necessary movements of the valves are accomplished with very little friction and wear. Each valve rocks on a concave seat, which forms the arc of a circle, and by making the valve of about the same length as the cylinder we are enabled to construct and arrange the ports in the valve-seat so that their greatest dimensions shall be lengthwise of the cylinder, while their width or dimensions in the direction of movement of the valve is very little; hence we can provide very large ports and still control them by a valve having very little movement.

The invention consists in certain novel combinations of parts, hereinafter described, and referred to in the claims.

Figure 5:
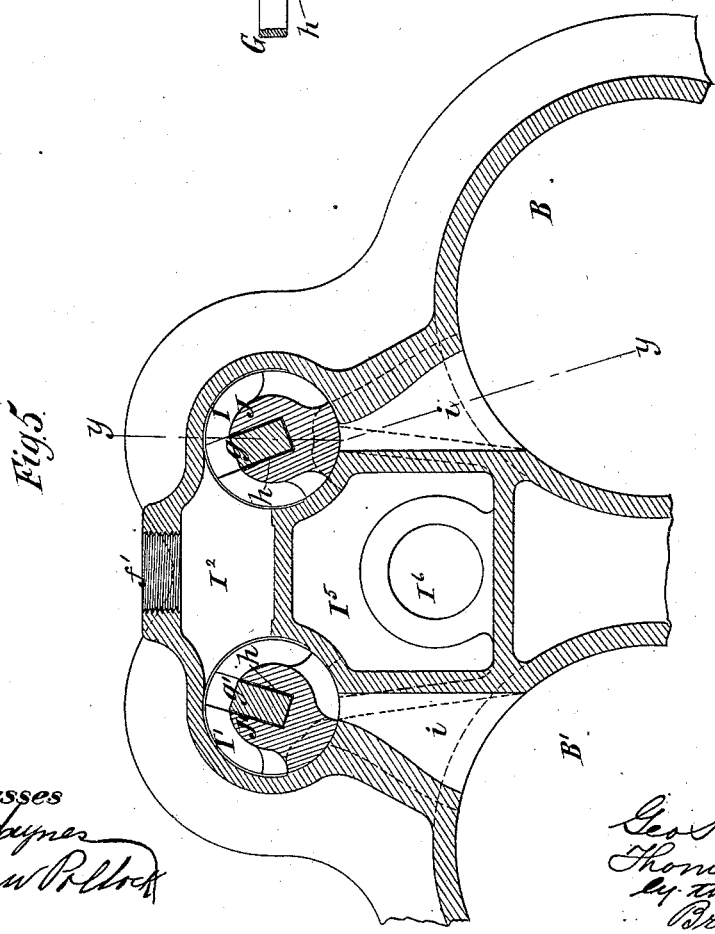

In the accompanying drawings, Figure 1 is a side elevation, partly in section, of a duplex pumping-engine embodying our invention. Fig. 2 is a plan of the engine, the valve-chests of the two steam-cylinders being in horizontal section, and the valves being removed to show the arrangement of ports in the valve-seats. Figs. 3 and 4 represent inverted plans of the two valves. Fig. 5 is a transverse section of the valve-chests, valves, and portions of the two steam-cylinders; and Fig. 6 is a longitudinal section on the dotted line $y\,y$, Fig. 5.

Similar letters of reference designate corresponding parts in all the figures.

A A' designate the two water-cylinders of the duplex engine or pump, and B B' designate the corresponding steam-cylinders. As here shown the water-cylinders are formed in a single casting, as also are the steam-cylinders. We do not, however, make any claim to the construction of these cylinders, and the rear portions of the water-cylinders and their chests are omitted. The cylinders are secured to a bed-plate or base-frame, $A^2$.

C C' designate the two piston-rods, which move in opposite directions, as in all duplex pumps.

D D' designate tie rods or braces, which connect the steam and water cylinders, the rod D serving to connect the cylinders A B, and the rod D' serving to connect the cylinders A' B'. It is usual to employ rods to tie together or connect the oppositely-arranged cylinders of pumps, and hence we make no claim to the rods D D' in themselves; but in our engine they serve other purposes in addition to their functions as tie rods or braces, as will be hereinafter described.

E E' designate arms which extend upwardly from the piston-rods C C', and are rigidly secured thereto. They may be adjusted to their proper place on the piston-rods when the pump is set up and there secured by set-screws $a\ a$, or other means. The rods D D' are arranged above and parallel with the two piston-rods C C', and the arms E E' at their upper ends are bored to fit said tie-rods and slide freely thereon as they move with the piston-rods. The arms E E', being guided on the said tie-rods D D', are always maintained in an upright position, and move in vertical planes. The tie-rods therefore serve also as guides for the said arms. The arms E E' might each consist of a single piece; but as here shown each arm consists of two pieces, $a'$ $a^2$, fitted telescopically together, as shown in section in Fig. 1. The upper portion, $a^2$, comprises a socket into which the lower portion, $a'$, extends, and although said portions move with the piston-rod as one arm, yet they may move relatively to each other in the direction of their length, in order to compensate for any differences in the measurement between the piston-rod and the tie-rod above it; hence the arm may fit snugly on the tie-rod D or D', and still there will be no liability of its binding thereon in case the tie-rod and piston-rod are not absolutely parallel. On the portion $a'$ of each arm E E' may be placed a roller, $a^3$, (best shown in Fig. 1,) and for a purpose hereinafter described.

F F' designate two valve-cams, one for each pump, and which are substantially alike in their construction. Each cam comprises a long slot, $b$, in which the roller $a^3$ moves during the whole length of piston-stroke, and which is somewhat oblique to the piston-rod, as best shown in Fig. 2. Each valve-cam F F', is formed with upwardly-extending arms $c\ c'$ at its opposite ends, and at the upper ends of these arms are hubs or eyes which are fitted to the tie-rod D or D', and which are free to turn thereon, thus allowing the cam F or F' to be swung in a direction transverse to the piston-rod by the action of the arm E or E' in the slot $b$. The tie-rods D D' therefore form fulcrums on which the valve-cams F F' may swing, but said cams have no movement lengthwise of the tie-rods. We will now describe how these tie-rods are made and secured in place. Each tie-rod is formed with a head, $d$, at one end, a screw-thread, $d'$, adjacent to the head, and a screw-thread, $d^2$, at the other end, and in the flange of each cylinder B or B' is a hole, $d^3$, through which the rod D or D' is inserted, while in each water-cylinder, A or A', is a threaded socket, $d^4$, into which the rod is screwed. In order to assemble the parts, the rod D or D' is inserted from the right through the hole $d^3$, and is then slipped through a nut, $d^5$; then through the hubs or eyes on the arms $c\ c'$ of the valve-cam F or F', and through the arm E or E', and a collar, $d^6$; and, finally, its end $d^2$ is screwed into the socket $d^4$. The nut $d^5$ is then tightened, thereby clamping the flange of the cylinder B or B' tightly between the nut $d^5$ and head $d$. The valve-cam F or F' is held against longitudinal movement by its arm $c'$ being held between the collar $d^6$, and the end of the socket $d^4$.

G G' designate the two valve-stems, which are provided with arms $e\ e'$, and these arms are connected by rods H H' with ears $f$ on the inner sides of the two valve-cams F E', the valve-cam F being connected by the rod H with the arm $e'$ on the valve-stem G', and the valve-cam F' being connected by the rod H' with the arm $e$ on the valve-stem G. From the above description it will be understood that the reciprocating movement of the piston-rods of the engine produces a slight swinging movement of the valve-cams, and a movement of the rods H H' and valve-stems G G', all in a plane transverse to the line of movement of the piston-rods.

I I' designate the valve-chests, and I² is a steam chamber or chest, which is in full communication with the valve-chests, and to which steam is supplied from an inlet, $f'$.

J J' designate the two valves from which the stems G G' project, and which are shown in Figs. 3, 4, 5, and 6.

The front heads I³ I⁴ of the valve-chests are formed with housings or skeleton frames, which comprise bearings $f^2$ for the outer ends of the valve-stems G G', as shown best in Figs. 1 and 2, and afford adequate support therefor. The portions $g\ g'$ of the valve-stems G G' are rectangular in transverse section, as shown in Figs. 5 and 6, and are each fitted to a corresponding recess, $h$, in the back of the valve. This connection between the valve and its stem insures the turning of the valve by its stem, and allows the valve to be kept to its seat without causing any side strain on the stem.

Below the steam chest or chamber I² is an exhaust chest or chamber, I⁵, from which leads the exhaust-pipe I⁶.

The steam and exhaust ports for each cylinder are alike, and hence a description of those of one cylinder and valve-chest will suffice.

At opposite ends of the cylinder are steam-supply ports $i\ i'$, and separate exhaust-ports $j\ j'$, (best shown in Fig. 6,) the separate exhaust-ports being employed to cushion the piston at each end of its stroke by reason of the piston covering the exhaust-ports. Where they enter the cylinder the greatest dimension of all the ports is in a direction around the cylinder, as is usual; but at their ends which are presented in the valve-seat all the ports have their greatest dimensions in the direction of the length of the cylinder. In fact those ends of the ports which are presented in the valve-seat are so spread in the direction of the length of the cylinder that they occupy the entire length of the valve-seat with the exception of the necessary bridges. Consequently the ports are very narrow and long, and while they may be made of ample area, a comparatively slight rocking movement of the valve will control them.

At the side of the exhaust-ports $j\ j'$ in the valve-seat are ports $j^2\ j^3$ which lead to the exhaust-chest $I^5$, and the valve J or J' is provided with an exhaust-cove, $j^4$, whereby the ports $j\ j^2$ are brought into communication, and with an exhaust-cove, $j^5$, whereby the ports $j'\ j^3$ are brought into communication. The piston K in Fig. 6 being about to move in the direction of the arrow, it will be observed that the valve J is in such a position that steam is admitted through the port $i'$, while the steam may exhaust from the opposite side of the piston through the ports $j\ j^2$, which are brought into communication through the exhaust-cove $j^4$ of the valve J. When the several moving parts are in the position shown in Figs. 1 and 2, the valve J will occupy a position corresponding to that shown in Fig. 6—that is to say, the supply-port $i$ in the valve-chest I will be closed, the exhaust-ports $j\ j^2$ will be in communication, the exhaust-ports $j'\ j^3$ will be closed, and the supply-port $i'$ will be open. At the same time the supply-port $i$ in the valve-chest I' will be open, the exhaust-ports $j\ j^2$ will be closed, the exhaust-ports $j'\ j^3$ will be in communication, and the supply-port $i'$ will be closed. The condition of all the ports, as above described, would produce the movement of the piston-rod C toward the left hand of Figs. 1, 2, and 6, and the movement of the piston-rod C' toward the right hand of Figs. 1 and 2.

What we claim as our invention, and desire to secure by Letters Patent, is—

1. The combination, with the two piston-rods and cylinders of a duplex engine and arms extending from said piston-rods, of two valves susceptible of a rocking movement, and having their axes lengthwise of the cylinders, valve-stems extending from said valves, two valve-cams wherein the said arms travel as the piston-rods are reciprocated, and rods extending transversely to the piston-rods and connecting the valve-cam of each engine with the valve-stem of the other engine, substantially as herein described.

2. The combination, with the two piston-rods and cylinders of a duplex pumping-engine, and tie-rods connecting each steam-cylinder with its opposite pump-cylinder, of two slotted valve-cams pivoted on said tie-rods, arms extending from the piston-rods through the slotted cams and guided by the said tie-rods, rocking valves having their axes lengthwise of the cylinders, and rods extending transverse to the piston-rods and connecting the valve-cam of each engine with the stem of the valve of the other engine, substantially as herein described.

3. The combination, with the piston-rod C and cylinders A B, of the tie-rod D, connecting said cylinders, the slotted valve-cam F, pivoted on said tie-rod and held against movement lengthwise thereof, and the arm E, for actuating said cam, extending from the piston-rod and guided by the tie-rod, and consisting of upper and lower portions, $a^2\ a'$, telescoped together, substantially as herein described.

4. The combination, with the piston-rod C and cylinders A B, of the tie-rod D, the slotted valve-cam F, pivoted on said rod and held against movement lengthwise thereof, and the arm E, for actuating said cam, extending from the piston-rod and guided by the tie-rod, and composed of portions $a'\ a^2$, telescoped together, and a roller, $a^3$, on the portion $a'$, substantially as herein described.

5. The combination of the piston-rod C, the cylinders A B, the tie-rod D, having a head, $d$, at one end and a thread, $d^2$, at the other end, the nut $d^5$ and collar $d^6$, the slotted valve-cam F, formed with arms $c\ c'$, fulcrumed on said rod, and the arm E, working in said cam and guided by said tie-rod, substantially as herein described.

6. In a duplex engine, the combination of the cylinders B B', and valve-chests I I', extending lengthwise thereof, the cylinders being furnished with supply-ports $i\ i'$, which at the valve-seats have their greatest dimensions in the direction of the length of the cylinders, and the valves J J' of approximately the same length as the cylinders, and susceptible of a rocking movement only, substantially as herein described.

7. In a duplex engine, the combination of the cylinders B B' and valve-chests I I', constructed with supply-ports $i\ i'$ and exhaust-ports $j\ j'\ j^2\ j^3$, arranged as described, and the valves J J', constructed with exhaust-coves $j^4\ j^5$, and susceptible of a rocking movement only, substantially as herein described.

GEO. H. REYNOLDS.
THOMAS J. RIDER.

Witnesses:
ROBERT BURNS,
J. R. SMITH.